(12) United States Patent
Kuwabara

(10) Patent No.: US 6,766,897 B2
(45) Date of Patent: Jul. 27, 2004

(54) LINEAR MOTION GUIDE UNIT

(75) Inventor: Hideki Kuwabara, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 0 days.

(21) Appl. No.: 10/405,622

(22) Filed: Apr. 3, 2003

(65) Prior Publication Data

US 2003/0205445 A1 Nov. 6, 2003

(30) Foreign Application Priority Data

May 1, 2002 (JP) ....................................... 2002-130045

(51) Int. Cl.[7] .............................................. B65G 25/04
(52) U.S. Cl. ................................ 198/750.1; 198/468.9
(58) Field of Search ........................ 198/465.1, 468.01, 198/468.9, 468.11, 750.1, 867.1, 867.14, 867.15

(56) References Cited

U.S. PATENT DOCUMENTS

| | | | | |
|---|---|---|---|---|
| 4,681,506 A | * | 7/1987 | Teramachi | 198/468.9 |
| 5,211,279 A | * | 5/1993 | Abbestam et al. | 198/750.1 |
| 6,520,320 B1 | * | 2/2003 | Wang et al. | 198/750.1 |
| 6,662,934 B1 | * | 12/2003 | Iida | 198/750.1 |

FOREIGN PATENT DOCUMENTS

JP          3237981          10/2001

* cited by examiner

Primary Examiner—James R. Bidwell
(74) Attorney, Agent, or Firm—Browdy and Neimark, P.L.L.C.

(57) ABSTRACT

A linear motion guide unit is disclosed in which a lower seal can be fastened easily, securely to a slider that travels relatively along a track rail. The slider is provided on a bottom surface thereof with a lug terminating in a hook that juts widthwise and extends lengthwise of the slider. The lower seal is made therein with a first hole allowing the lug to fit in there, and a second hole made connected to the first hole in longitudinal direction of the lower seal and made on at least any one lengthwise edge thereof with a tooth that will come into hooked engagement with the hook on the lug. The lug jutting out of the slider to fasten the lower seal is made at a flat bottom area near the track rail, which is over a space left open underneath the end cap.

15 Claims, 7 Drawing Sheets

LINEAR MOTION GUIDE UNIT

BACKGROUND OF THE INVENTION

1. Field of the Invention

The present invention relates to a linear motion guide unit having wide application in sliding parts incorporated in a variety of machines and apparatus including, for example, semiconductor manufacturing equipments, precision measurement/inspection instruments, precision-assembling machines, and so on. More particularly, it relates to a linear motion guide unit in which a slider is allowed to move relatively to an elongated track rail by virtue of rolling elements.

2. Description of the Prior Art

Although the linear motion guide units have come to be used extensively in machinery in fields as diverse as semiconductor manufacturing equipments, measurement/inspection instruments and so on, the expansion of their uses accompanied by the current developments in advanced technologies requires more and more such linear motion guide units that can manage growing demands for less noise, low-frictional resistance, long-lasting service life, high precision, high-speed sliding motion, easy assemblage, versatility and the like. With the prior linear motion guide units, moreover, the slider is commonly provided with a lower seal to keep the foreign matter such as dirt and dust against entering inside a raceway or a raceway groove, resulting in ruin of the sliding performance of the slider relatively to the track rail, and also prevent the contaminants including debris, metal cuttings and so on, which might occur in the linear motion rolling guide unit in itself, from escape outside the linear motion guide units.

In Japanese Patent No. 3237981, which was granted for a senior invention of the same applicant as in the present application, there is disclosed a linear motion guide unit in which the slider is mounted with the lower seal. With the prior linear motion guide unit, the lower seal is designed to make attachment to and/or detachment from the slider much easier and envisaged to make sure of a room ample in height above the top of the base on which the track rail lies and underneath the slider that fits astride over the track rail. The slider is composed of a carriage, and end caps attached on forward and aft ends of the carriage, one to each end. The end cap has a lug underneath, which extends downward along the side closer to the track rail and terminates in hooks. The lower seal is made up of a metal backing plate and an elastic member, both of which are made therein with holes to fit the lug therein, which are located in such relation to one another that an edge of the hole in the elastic member is partially inside the hole made in the metal backing plate. To fasten the lower seal to the end cap, the lug on the end cap is first forced to fit into the lower seal while having the hole edge of the elastic member deformed elastically, and then the hook comes into biting engagement with the hole edge of the metal backing plate to accommodate the lower seal within a room reserved for any grinding tool in the carriage of the slider.

With the linear motion guide unit constructed as recited just above, nevertheless, the first and second holes located in offset relation to one another in the lower seal would need urging the lug of the end cap into the holes while having the elastic member of the lower seal deformed elastically to assemble the lower seal with the slider. Thus, this prior construction has to go through some chores of pressing the lower seal to the end cap against elasticity of the elastic member in the lower seal. Moreover, the hooks on the lug of the end cap, because of made in a way extending towards the front or the rear, should not be able to extend as long as desired to make sure of certain biting engagement of the hooks with the lower seal. Thus, the biting engagement of the hooks with the lower seal in the prior slider recited earlier is too small in size to make ensure the satisfying engagement of the hooks with the lower seal safely.

SUMMARY OF THE INVENTION

The present invention, therefore, has as its primary object to overcome the problem as described just above and more particular to provide an improved linear motion guide unit in which a secure fastening of a lower seal to an end cap of a slider can be indeed ensured with just a slight lengthwise shift of the lower seal relatively to the associated end cap after a lug of the end cap has fit in a recess made in the lower seal.

The present invention is concerned with a linear motion guide unit; comprising a track rail made on a lengthwise side thereof with a first raceway surface, a slider movable lengthwise along the track rail, the slider having a second raceway surface in opposition to the first raceway surface, a rolling element running through a load raceway defined between the confronting first and second raceway surfaces, and a lower seal installed underneath the slider to close the load raceway; wherein the slider is provided on a bottom surface thereof with a lug terminating in a hook that juts widthwise and extends lengthwise of the slider; wherein the lower seal is made therein with a first hole allowing the lug to fit therein, and a second hole connected to the first hole in longitudinal direction of the lower seal and made on at least any one lengthwise edge thereof with a tooth that will come into hooked engagement with the hook on the lug; and wherein the lug of the slider fits in the first hole in the lower seal and then is moved into the second hole relative to the lower seal to fasten the lower seal to the slider. With the linear motion guide unit of the present invention stated earlier, it is to be under stood that the rolling element may be either a ball or a roller, and the terminology "raceway surface" includes "raceway groove". Moreover, the words "at least one lengthwise edge" is the conception applied, not only to any one side, to both sides.

In one aspect of the present invention, a linear motion guide unit is provided in which the slider is comprised of a carriage made with the second raceway surface and a return passage allowing the rolling element to run through there, end caps fastened to lengthwise opposite ends of the carriage, one to each end, and made therein a turnaround to connect the second raceway surface to the return passage, getting the rolling element turning about there in running direction thereof and further made thereon with the lug, the end seal fastened to the end caps, and a retainer extending along by the carriage to keep the rolling element in place. It is to be understood that the terminology "retainer" used earlier has the conception including all the shape like rod, plate or band.

In another aspect of the present invention, a linear motion guide unit is provided in which both the first and second holes formed in the lower seal are made at lengthwise opposite ends of the lower seal so as to parallel the lugs of the end caps in a way oriented in the same direction along the longitudinal direction and also arranged at the same interval with one another. In a further another aspect of the present invention, there is disclosed a linear motion guide unit in which the lug made on the slider to fasten the lower seal thereto is located at a flat bottom area near the track rail over a space reserved underneath the end cap.

In another aspect of the present invention, a linear motion guide unit is provided in which a lengthwise dimension of the lug on the slider is made almost the same size in length as each of the first and second holes in the lower seal.

In another aspect of the present invention, a linear motion guide unit constructed is provided in which the lower seal includes a backing plate having a tooth extending lengthwise along at least one edge of the second hole, and an elastic sealing member adhering to the backing plate to close the load raceway. In another aspect of the present invention, there is disclosed a linear motion guide unit in which the backing plate of the lower seal is composed of a major flat portion where there are formed both a slot edged with the tooth to define the second hole and a window connected lengthwise with the slot to define the first hole, and a slanting portion integral with the major flat portion and extending lengthwise while making face-to-face engagement with a slantwise surface area that extends over the space left open just underneath the slider. In a further another aspect of the present invention, there is disclosed a linear motion guide unit in which the tooth made on the backing plate of the lower seal has at a sidewise edge thereof a sealing tip that will come into engagement with a pedestal of the lug on the slider.

In another aspect of the present invention, a linear motion guide unit is provided in which the sealing member of the lower seal includes a first sealing part adhering to a lower side of the backing plate and extending over an entire length of the backing plate, a second sealing part lying lengthwise on an upper side of the backing plate in a fashion bulging out up to coming into contact with a slantwise surface area over the space where a lengthwise bottom surface of the carriage is partially cut away, and a third sealing part lying on the upper side of the backing plate along a longitudinal bottom surface of the end cap. In a further another aspect of the present invention, there is disclosed a linear motion guide unit in which the first sealing part is made therein with an opening to define the second hole and a pocket constituted with the first hole that is connected lengthwise with the opening and closed with a thin bottom, and wherein the opening is larger in widthwise dimension than the slot edges with at least one tooth formed on the backing plate and roughly equal in width with the hook, while the pocket is substantially equal in width with the window in the backing plate.

In another aspect of the present invention, a linear motion guide unit is provided in which the thin bottom is made with a traverse ridge raised above the thin bottom towards the backing plate along a traverse edge of the thin bottom. After the lower seal has been fastened to the end cap, the thin bottom in the lower seal comes into engagement at the traverse ridge thereof with any adjacent one of the forward and aft ends of the hook of the lug to close the second hole in the first sealing part, helping improve the sealing performance of the lower seal.

In another aspect of the present invention, a linear motion guide unit is provided in which the first sealing part involves a first lip extending in the longitudinal direction of the lower seal so as to come into engagement with any associated side of the track rail, and a second lip made to extend lengthwise to make sliding engagement with the slantwise surface area beneath which the space is left open.

In another aspect of the present invention, a linear motion guide unit is provided in which a pedestal of the lug jutting out of the end cap of the slider is made with a recess extending lengthwise between the hook and a bottom surface of the end cap, so that the lower seal is fastened to the end cap after the tooth made on the backing plate of the lower seal has come into engagement with the recess. With the linear motion guide unit constructed as stated earlier, the lug made on the slider first fits in the pocket below the backing plate of the lower seal, and then the recess on the lug fits over the tooth on the lower seal to fasten the lower seal to the end cap.

In a further aspect of the present invention, a linear motion guide unit is provided in which the slider fits over the track rail for linear movement relative to the track rail.

According to the linear motion guide unit of the present invention constructed as recited earlier, while the end cap of the slider is made on the bottom surface thereof with the lug terminating in the hooks, the lower seal has both the first hole allowing the lug to fit therein and a second hole edged lengthwise with the teeth that may make engagement with the hooks. Thus, certain engagement of the hooks on the lug of the end cap with the teeth of the lower seal to make sure of fastening securely the lower seal to the slider can be easily accomplished by just the act of first introducing the hooks into the first hole in the lower seal and then slightly moving the hooks into the second hole where the hooks come in hooked engagement with the teeth of the lower seal.

With the linear motion guide unit constructed as stated earlier, the lower seal can be mounted easily, securely to the end cap with the sealing member in the lower seal being less subject to elastic deformation when fastened to the end cap. Moreover, the fastening construction of the present invention makes it possible to certainly, smoothly and securely install the lower seal in the slider without causing any damage that might take away any of the sealing effects even for the large linear motion guide units.

DETAILED DESCRIPTION OF THE PREFERRED EMBODIMENTS

Figure 1:
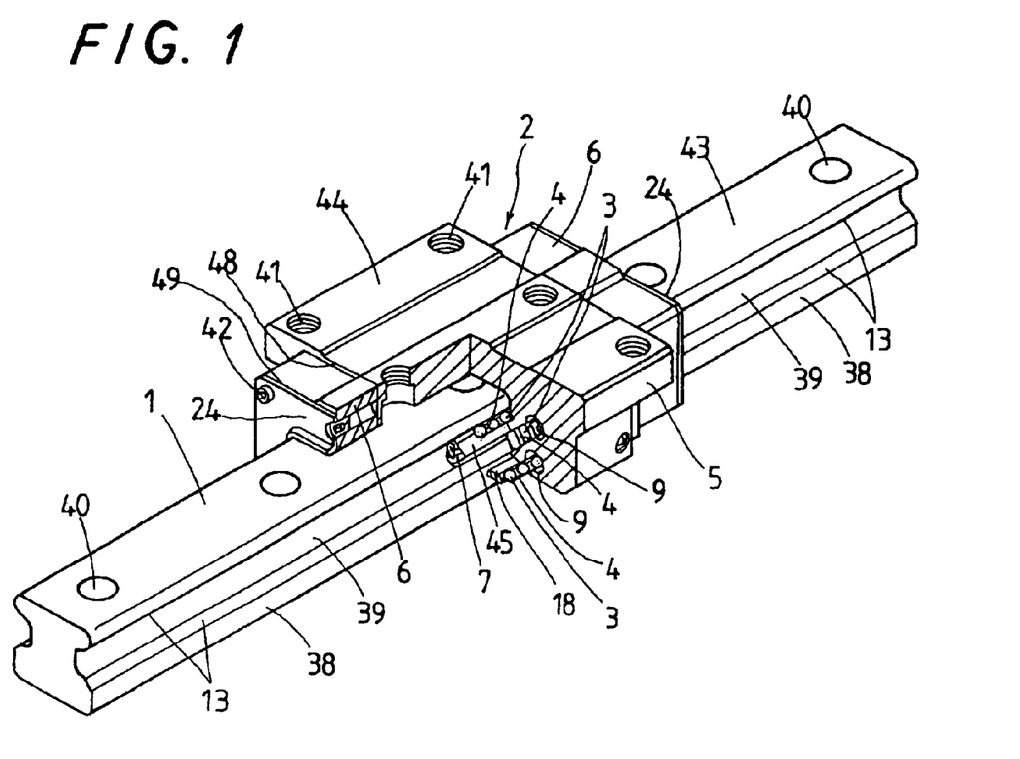
FIG. 1 is a perspective view, partially broken away, showing a preferred embodiment of a linear motion guide unit in accordance with the present invention.

A preferred embodiment of a linear motion guide unit according to the present invention will be explained hereinafter in detail with reference to the accompanying drawings. The linear motion guide unit of the present invention is envisaged to use it in various types of machinery, whether small machines or large machines, including sliding parts incorporated in, for example, assembling machines including semiconductor manufacturing equipment, precision measurement/inspection instruments, precision assembly machines, machine tools, industrial robots, and so on. More particular, the linear motion guide unit is available in a way interposed between a fixed body such as a machine bed and the like and a moving body including a worktable and so on, which are allowed to move relative to one another. The linear motion guide unit, as shown in FIG. 1, is mainly constituted with an elongated track rail 1, and a slider 2 allowed traveling along a longitudinal direction of the track rail 11. The slider 2 is made to have lower parts 15, 17 spaced widthwise apart from one another to provide a recess between them, so that the slider 2 fits over and conforms to the track rail 1 for linear movement relative to the track rail 1.

Figure 2:
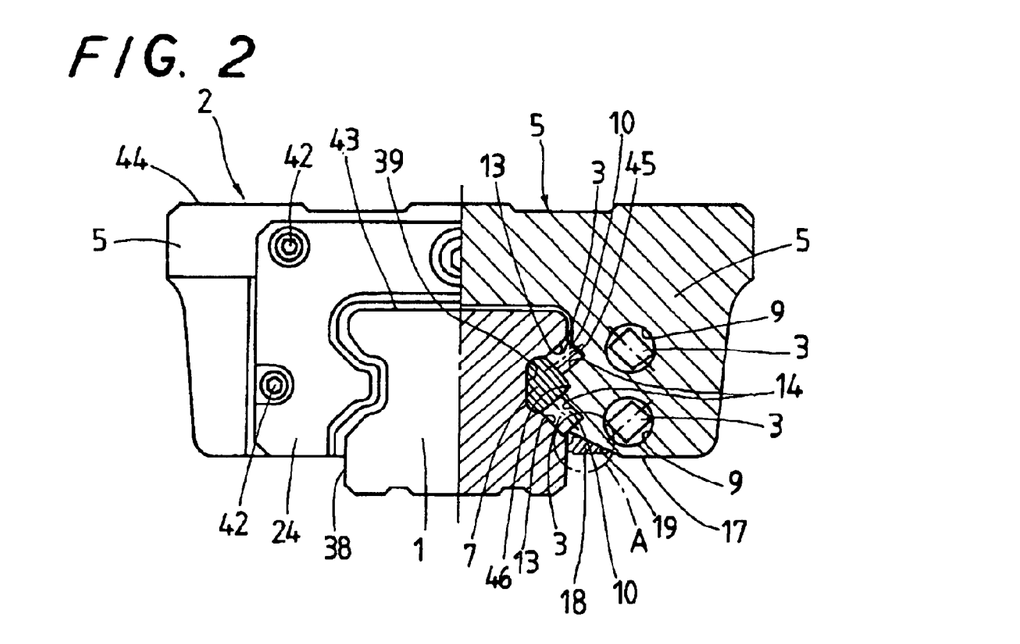
FIG. 2 is a front elevation of the linear motion guide unit of FIG. 1, in which a widthwise half thereof is shown in cross section.
Figure 3:
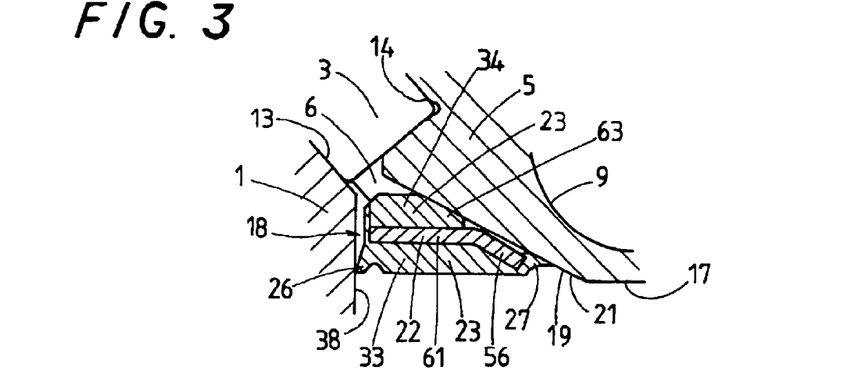
FIG. 3 is a fragmentary enlarged section showing an area encircled with A in FIG. 2.

As shown in FIGS. 1 to 3, a preferred embodiment of the linear motion guide unit stated hereinafter is comprised of the track rail 1 having widthwise opposing sides extended lengthwise and provided thereon with pairs of first raceway surfaces 13, one pair to each side, the slider 2 allowed to move in the longitudinal direction of the track rail 1 and provided therein with second raceway surfaces 14 confronting their associated first raceway surfaces 13 on the track rail 1, and a lower seal 18 arranged on a bottom surface 15 of an end cap 6 in the slider 2 to close a load raceway 10 defined between the confronting first and second raceway surfaces 13, 14.

The slider 2 is mainly comprised of a carriage 5 made therein with a pair of the second raceway surfaces 14 and a pair of return passages 9 for non-loaded routes where a rolling element 3 is allowed to run through there, the end caps 6 fastened on forward and aft end surfaces 48 of the carriage 5, one to each end surface, and made therein with turnarounds 12 (refer to FIG. 4) for non-loaded routes, which connect the raceway surfaces 14 with their associated return passages 9 to allow the rolling element 3 to turn about in rolling direction, end seals 24 attached on end faces 49 of the end caps 6, one to each end cap, and a retainer plate 7 having a retainer surface 45 lying lengthwise of the carriage 5 to keep the rolling element 3.

With the linear motion guide unit constructed as stated earlier, the end caps 6 are each provided therein with a port 30 (refer to FIG. 4) ready for a grease nipple to ensure smooth running of the rolling element 3. The end cap 6 together with the associated end seal 24 are fastened to the carriage 5 with threaded screws 42. The turnarounds 12 formed in the end caps 6 are each made up of a shallow turnaround route 29 and a deep turnaround route 28. The shallow turnaround route 29 is short in its overall length compared with another deep turnaround route 28 and communicates the upper load raceway 10 to the lower return passage 9 through a connector 60, while the deep turnaround route 28 communicates the lower load raceway 10 to the upper return passage 9 through the connector 60. The deep turnaround route 28, as being located in a way receding out to extend behind the shallow turnaround route 29, is longer in its overall length than the shallow turnaround route 29. The connector 60 formed on the end cap 6 has a function of introducing the turnarounds 12 in the end cap 6 into precise alignment with their associated return passages 9 in the carriage 5.

With the linear motion guide unit as stated earlier, slider 2 can smoothly travel relatively to the track rail 1 by virtue of many rolling elements 3 that are allowed to run through the load raceway 10 defined between the first raceway surface 13 on the track rail 1 and the second raceway surface 14 on the carriage 5. Moreover, the embodiment discussed here has separators 4 that are each disposed between any two adjoining rolling elements 3. The track rail 1 is secured to a fixed bed or the like by use of fastening bolts that fit in bolt holes 40 made on a top surface 43 in a way spaced away lengthwise from one another at a preselected interval. Moreover, the slider 2 is provided at an upper surface 44 thereof with threaded holes 34 in which fastening bolt is screwed to mount a worktable and so on to the slider 2. Thus, the worktable is allowed to travel relatively to the fixed bed as the slider 2 moves linearly back and forth in a sliding manner with respect to the track rail 1.

With the embodiment discussed here, as shown in FIGS. 1 and 2, lengthwise major recesses 39 are made on the widthwise opposing sides 38 of the track rail 1, one to each side, with flanked by the raceway surfaces 13. A lengthwise minor recess 46 to keep the retainer plate 7 in place is made in the carriage 5 in such a way extending along and between the paired raceway surfaces 14.

A recirculating circuit where the rolling elements together with the separators 4 are allowed to run through there in a recirculating manner is comprised of the paired load raceways 10 defined between the raceway surfaces 13 on the track rail 1 and the raceway surfaces 14 on the carriage 5, the turnarounds 12 made in the end caps 6 to be connected with the associated load raceways 10, and the return passages 9 made in the carriage 5 to come in communication with the associated turnarounds 12. The rolling elements 3 can travel through the recirculating circuit together with the separators 4 that are each interposed between any two adjoining rolling elements 3 to space them apart from one another. The separator 4 lying between any two adjacent rolling elements 3 is formed to snugly embrace the adjacent rolling elements 3, helping ensure smooth running travel of the rolling elements 3.

Figure 4:
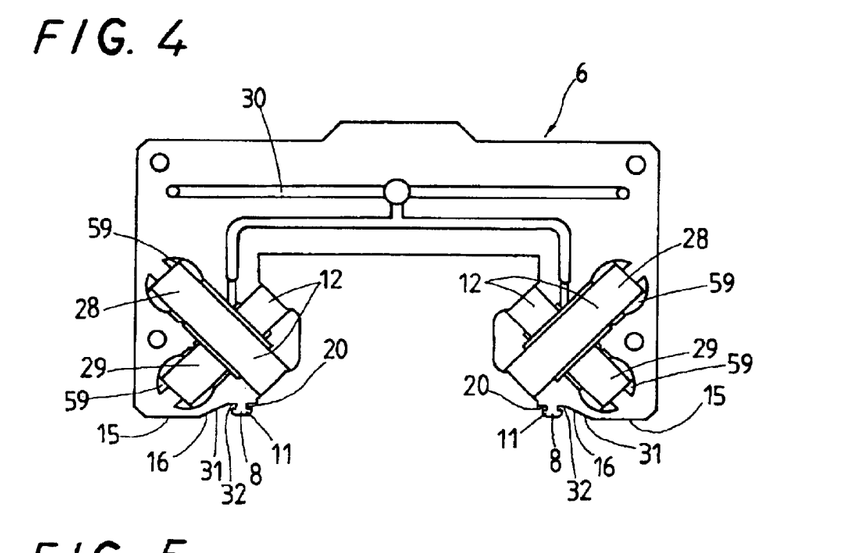
FIG. 4 is a rear elevation showing an end cap in the linear motion guide unit of FIG. 1.
Figure 5:
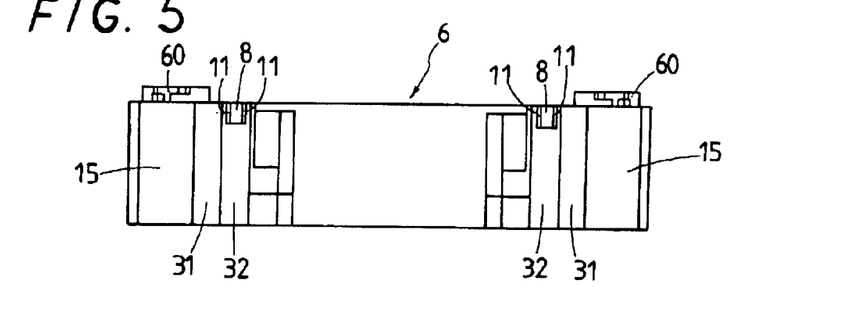
FIG. 5 is a bottom view showing the end cap of FIG. 4.
Figure 6:
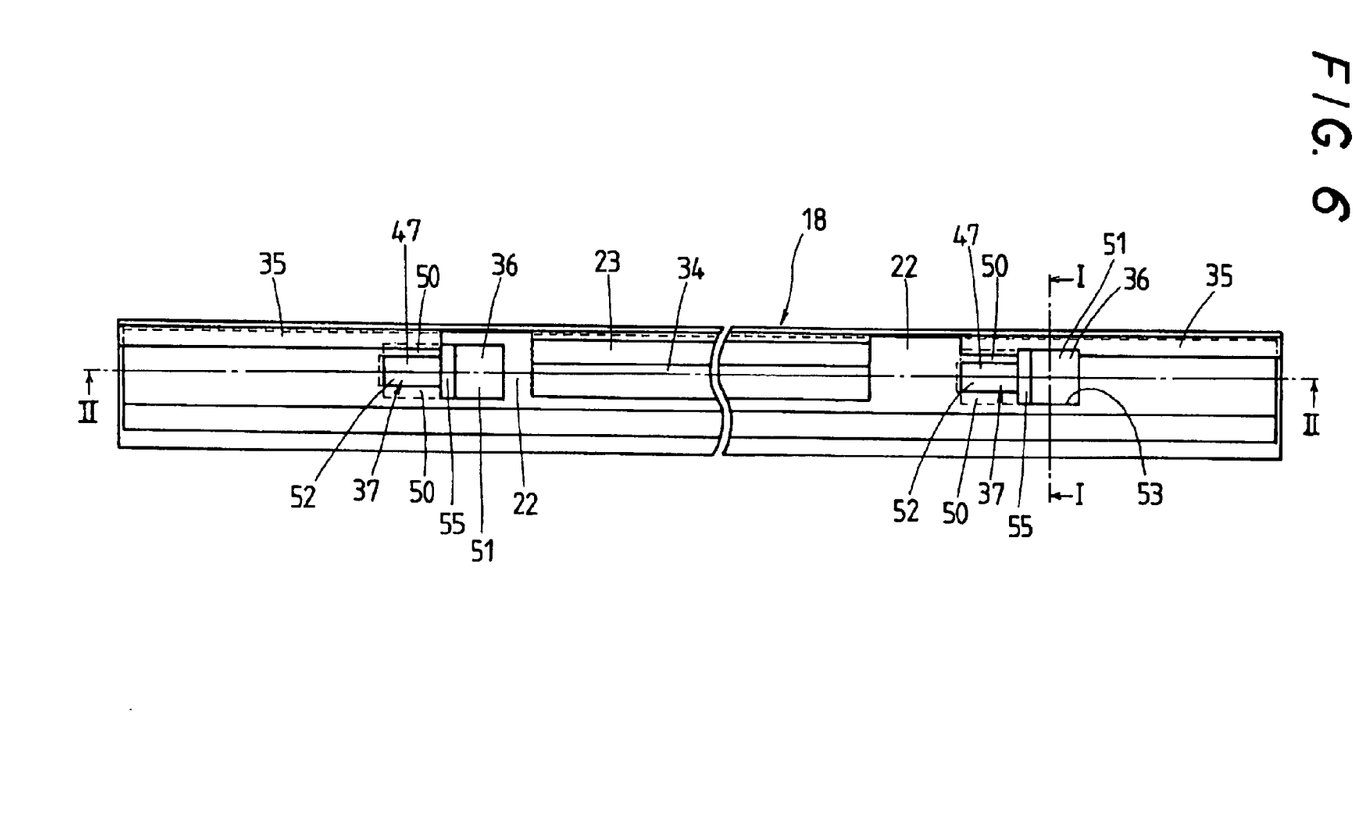
FIG. 6 is a plan view, partially broken away, showing a lower seal for the linear motion guide unit of FIG. 1.
Figure 7:
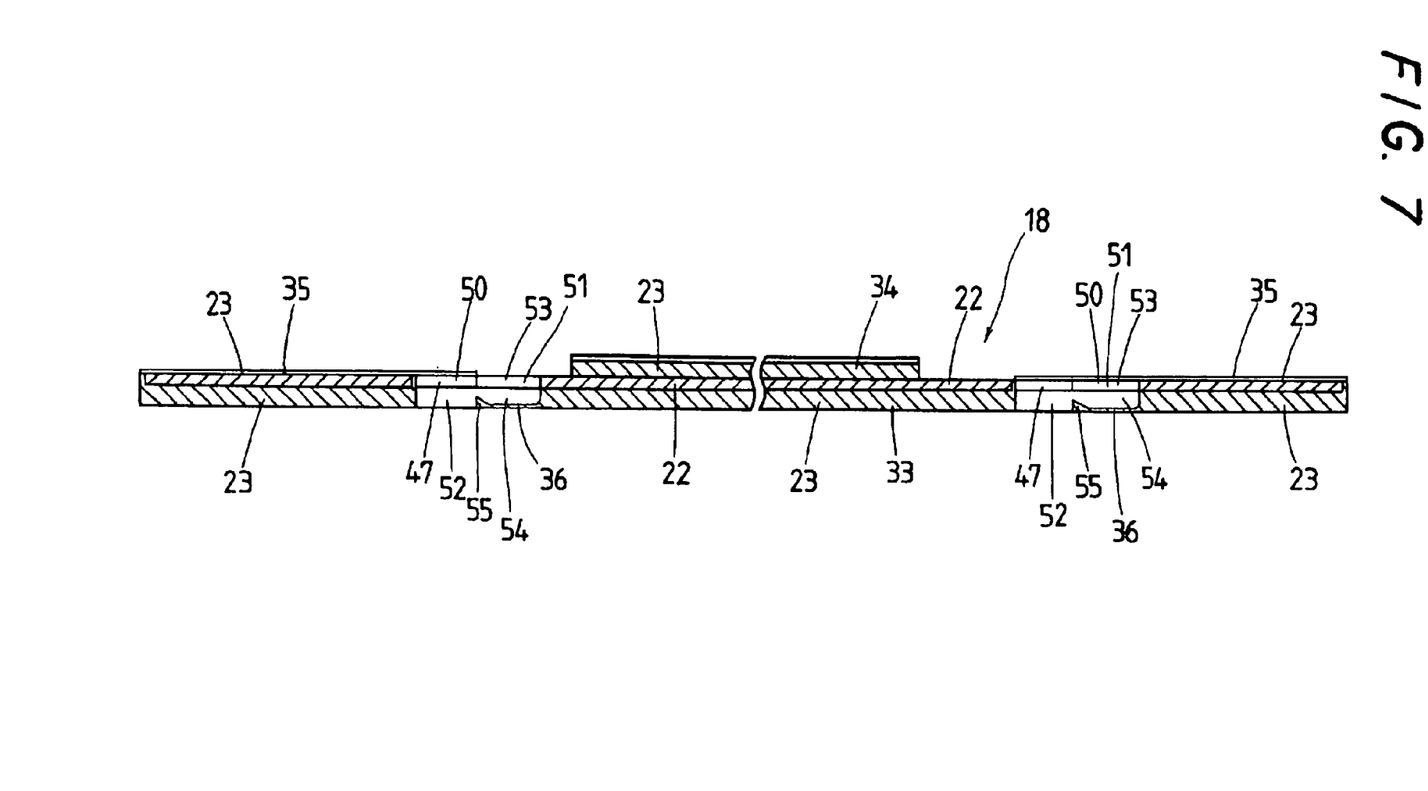
FIG. 7 is a longitudinal section of the lower seal taken along a line II—II of FIG. 6.
Figure 8:
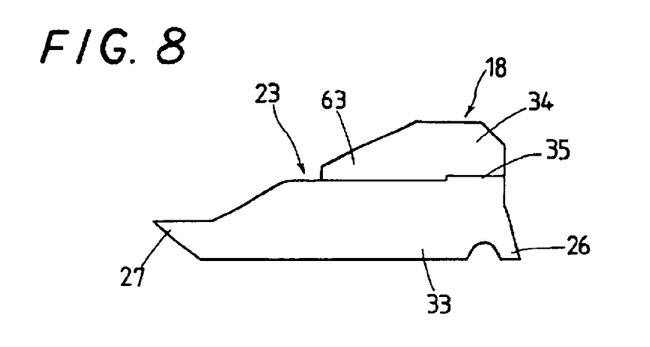
FIG. 8 is an end elevation of the lower seal of FIG. 6.

A bottom surface 17 of the carriage 5, as shown in FIG. 3, is partially beveled at an area nearer the track rail 1 to provide a slantwise surface area 21, where a space 19 is left open to make it possible to introduce a grinding wheel used for cutting the raceway surfaces 14 inside the carriage 5. Moreover, as shown in FIGS. 4 and 5, the end cap 6 has a bottom surface 15 that is also cutaway in the same way as the carriage 5 at an area nearer the track rail 1 to provide a space 16 defined by combination of a slantwise surface area 31 flush with the slantwise surface area 21 for the space 19 underneath the carriage 5 and a horizontal flat bottom area 32 closest to the track rail 1.

According to the linear motion guide unit of the present invention, a lower seal 18, as seen from FIGS. 2 and 3, is accommodated in the spaces 16, 19 or the rooms reserved underneath the carriage 5 as well as end caps 6 of the slider 2 for introducing the grinding wheel inside the carriage 5. Thus, the lower seal 18 fits in the slider 2 in a fashion not protruding downward beyond the underneath 15, 17 of the carriage 5 and end caps 6 of the slider 2.

Figure 11:
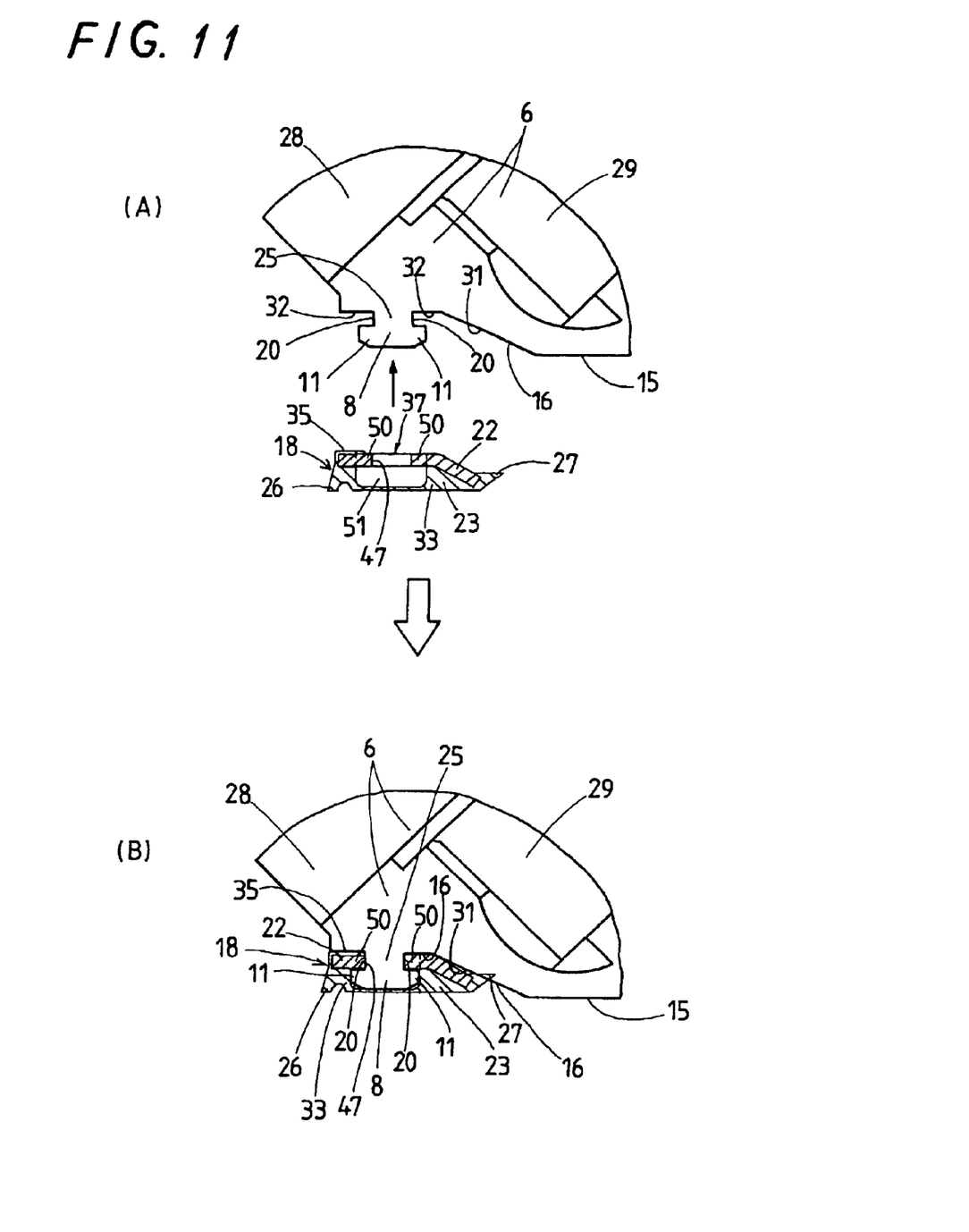
FIG. 11 is a fragmentary enlarged illustration viewed from the rear side of the end cap to explain how the lower seal comes in engagement with the associated end cap.

The lower seal 18 is made up of a backing plate 22 of material including metal and so on high in stiffness, and a sealing member 23 rich in elasticity and adhering to the metal backing plate 22. More particularly, the sealing member 23 of the lower seal 18 is made of elastic material baked on the metal backing plate 22. The lower seal 18, as illustrated in FIG. 11, has an upper surface raised upwards to conform to the configuration of the spaces 16 left open underneath the end caps 6. Moreover, the metal backing plate 22 of the lower seal 18, as shown in FIG. 11, is made of a slender member of flat rectangle, which is formed into about the same configuration as the spaces 16 left open underneath the end caps 6. The lower seal 18 has a fore-and-aft length corresponding with a lengthwise distance between the forward and aft end seals 24 attached on the associated end caps 6. Thus, the lower seal 18 extends over the entire fore-and-aft length of the slider 2, which covers the bottom surface 17 of the carriage 5 and the bottom surfaces 15 of the forward and aft end caps 6, thereby closing completely a clearance left between the track rail 1 and the slider 2.

The sealing member 23 of the lower seal 18 includes a first sealing part 33 adhering to a lower side 58 of the metal backing plate 22 with extending over the entire length of the metal backing plate 22, a second sealing part 34 lying lengthwise on an upper side 57 of the metal backing plate 22 in a fashion bulging out up to coming into contact with the slantwise surface area 21 of the room 19 where the lengthwise bottom surface 17 of the carriage 5 is partially cut away, and a third sealing part 35 lying on the upper side 57 of the metal backing plate 22 along by the fore-and-aft bottom surface 15 of the end cap 6. The upper side 57 of the metal backing plate 22, although largely naked on the upper surface of the lower seal 18 as shown in FIGS. 6 to 9, is coated at the forward and aft end areas with the third sealing part 35 of rubber lean in thickness, which is baked on the metal backing plate 22 along by only the lengthwise side near the track rail 1. About midway between the forward and aft end areas of the lower seal 18, moreover, the second sealing part 34 is baked on the metal baking plate 22 in a fashion raised above the upper side 57 of the metal backing plate 22. The lower seal 18 long in its longitudinal direction is apt to get warped easily after the lower seal 18 is fastened to the end caps 6. To cope with this, the second sealing part 34 bulging out upwards is made of elastic material that can get compressed with a sloping top thereof coming into close engagement with the mating slantwise surface area 21 of the carriage 5 as shown in FIG. 3, thereby supporting correctly the lower seal 18 to the slider 2. It will be understood that the bulged top of the second sealing part 34 works well to keep the major middle of the lower seal 18 to follow the slantwise surface area 21 of the carriage 5.

Moreover, the first sealing part 33 of the sealing member 23, as shown in FIG. 3, involves a first lip 26 extending in the longitudinal direction of the lower seal 18 so as to come into engagement with the associated side 38 of the track rail 1 to close a lengthwise clearance left between the associated side 38 of the track rail 1 and the bottom surface 17 of the carriage 5, and a second lip 27 made in widthwise opposition to the first lip 26 to extend lengthwise to make sliding engagement with both the slantwise surface areas 21, 31 beneath which the recessed rooms 16, 19 are left open over both the carriage 5 and the end caps 6. The lips 26, 27 are formed of elastic material of synthetic rubber extending along the lengthwise sides of the lower seal 18, one to each side. The lip 27 made of elastic material is allowed to get compressed to make certainly close engagement with the slantwise surface area 21 of the carriage 5 after the lower seal 18 has been fastened to the slider 2, helping make sure of the sealing performance at the lip 27. Another lip 26 of the lower seal 18, while coming into elastic abutment against the associated side of the track tail to help make sure of high sealing performance there, has to be considered so it could cause no rise in sliding resistance that might be encountered when the slider 2 move relative to the track rail 1.

With the linear motion guide unit discussed here, a lug 8 is provided on the bottom surface 15 of the end cap 6 in the slider 2, with situated widthwise inside near the carriage 5 on the bottom surface 15. The lug 8 terminates at its tip in hooks 11 spreading widthwise in opposition to one another while extending lengthwise in parallel with each other. In contrast, the lower seal 18 is made therein with a first hole 51 enough to allow the lug 8 to move freely in and out the lower seal 18 through there, and a second hole 37 made connected to the first hole 51 in the longitudinal direction of the lower seal 18 and made on lengthwise edges thereof with teeth 50, one to each edge, which are located in widthwise opposite relation to one another to make hooked engagement with the hooks 11 on the lug 8. Both the first and second holes 51, 37 formed in the lower seal 18 are made at the forward and aft ends of the lower seal 18 so as to parallel the lugs 8 of the end caps 6 in a way oriented in the same direction along the longitudinal direction and also arranged at the same interval with one another. That is to say, the metal backing plate 22 of the lower seal 18 is provided at the forward and aft ends thereof with teeth 50 spaced apart in widthwise opposite relation to one another to leave a slot 47 open between the teeth 50. The lug 8 jutting out of the end cap 6 is located at the horizontal flat bottom area 32 closest to the track rail 1 over the space 16 just underneath the end cap 6 in a shape of Tee seen from the front elevation where the hooks 11 extend sidewise in opposition directions to one another to form sidewise opposing recesses 20 between the hooks 11 and the horizontal flat bottom area 32 of the end cap 6 to allow the teeth to come into hooked engagement with hooks 11.

Figure 9:
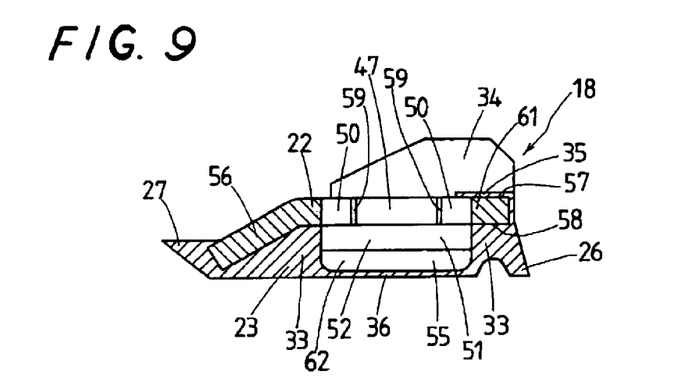
FIG. 9 is a traverse section of the lower seal taken along a line I—I of FIG. 6.
Figure 10:
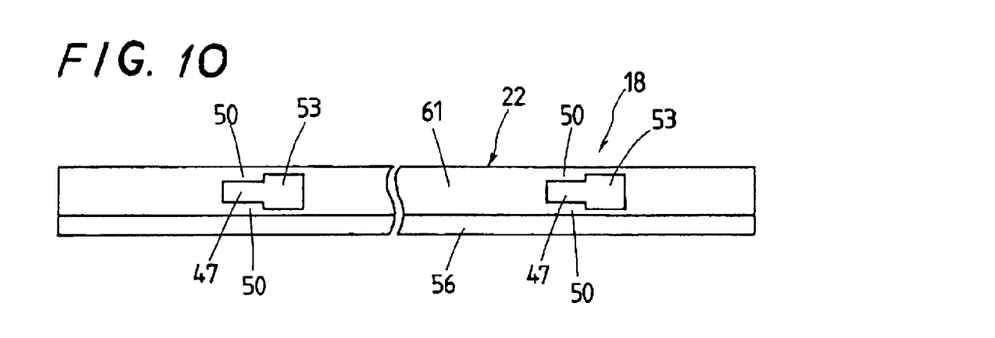
FIG. 10 is a plan view showing a metal backing plate in the lower seal of FIG. 6.

Moreover, the metal backing plate 22 of the lower seal 18 is made up of a major flat portion 61, refer to FIG. 9, where there are formed both the slot 47 edged with the teeth 50 to define the second hole 37 and a window 53 connected lengthwise with the slot 47 to define the first hole 51, and a slanting portion 56 integral with the major flat portion 61 and extending lengthwise while making face-to-face engagement with the slantwise surface area 21 that extends over the space 19 just underneath the carriage 5. The overall length of the first and second holes 51, 37 made in the lower seal 18 is roughly twice as long as the fore-and-aft length of the hooks 11. The lengthwise dimension of the lug 8 on the end cap 6 is made almost the same size in length as each of the first and second holes 51, 37 in the lower seal 18.

The teeth 50 formed on the widthwise opposing edges of the slot 47 in the metal backing plate 22 of the lower seal 18, as seen in FIG. 9, has at their sidewise opposing edges sealing tips 59 of synthetic rubber rich in elasticity, one to each edge, which is applied with, for example baking procedure to come into engagement with a necked stem 25 of the lug 8. That is to say, the sealing tips 59 are made of synthetic rubber baked thinly over the widthwise opposite edges of the teeth 50. The sealing tips 59 help clamp closely and securely the necked stem 25 of the lug 8 without causing unsteadiness after the lug 8 of the end cap 6 has fit in between the teeth 50 of the lower seal 18 with the teeth 50 of the lower seal 18 coming into hooked engagement with the recesses 20 cut in the lug 8. To this end, the sealing tips 59 of the teeth 50 located in opposition to one another are spaced apart widthwise across an interval that has no allowance or some interference with respect to a diameter or width of the necked stem 25 remaining between the recesses 20 cut in the lug 8 on the end cap 6. In other words, the sealing tips 59 of the teeth 50 are spaced apart to either cause zero clearance or produce some pressure between the mating the necked stem 25 of the lug 8 and the sealing tip 59 of the associated tooth 50. It will be thus understood that the teeth 50 are located in widthwise opposition to one another across an interval somewhat larger in distance than the diameter or width of the necked stem 25 between the recesses 20 cut in the lug 8.

Figure 12:
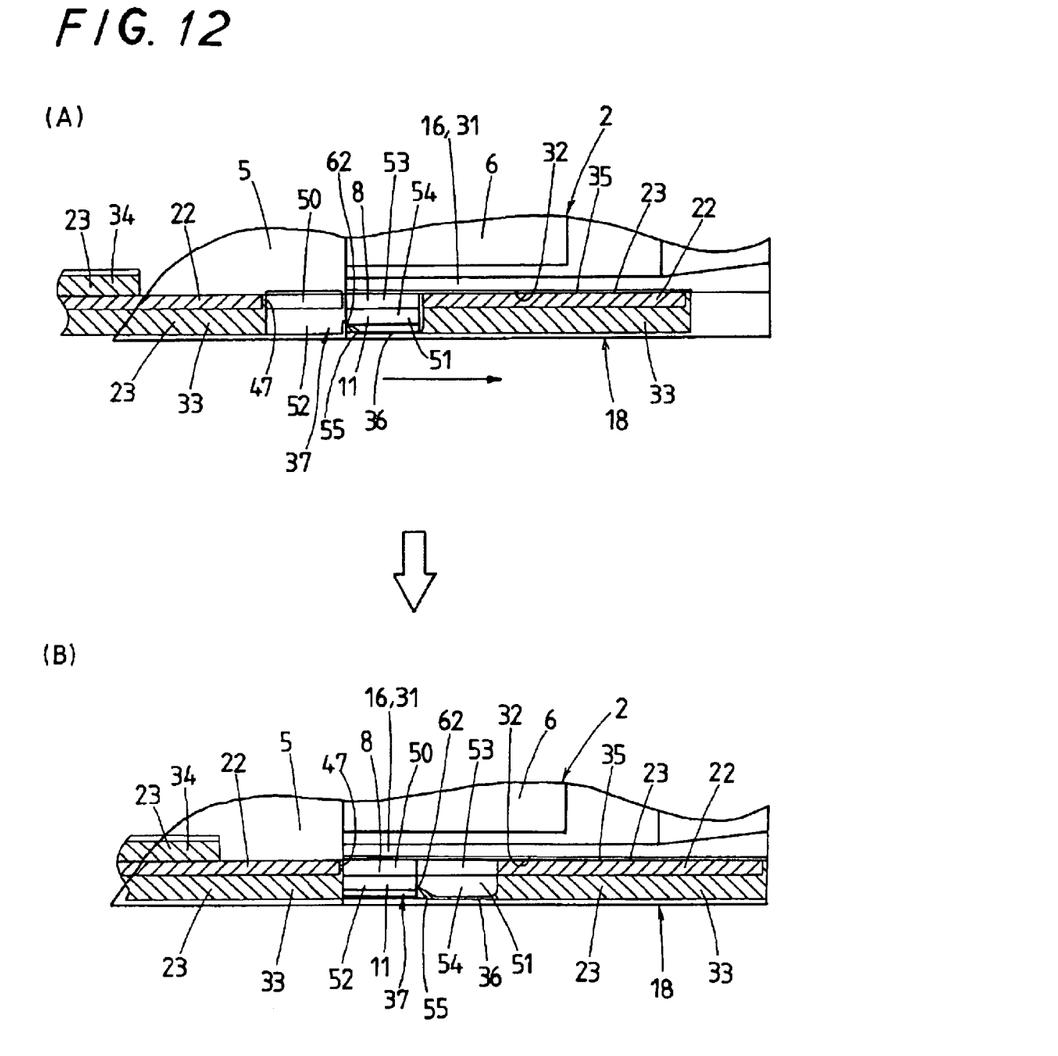
FIG. 12 is a fragmentary enlarged longitudinal section illustrating how the lower seal comes in engagement with the associated end cap.

As stated earlier, the lower seal 18 is made at forward and aft ends thereof with the first and second holes 51, 37 located in connected relation to one another. More particularly, the first sealing part 33 in the sealing member 23 is made therein with an opening 52 to define the second hole 37 and a pocket 54 constituted with the first hole 51 that is connected lengthwise with the opening 52 and closed with a thin bottom 36. The opening 52 is larger in widthwise dimension than the slot 47 defined between the teeth 50 formed on the metal backing plate 22, while the pocket 54 is substantially equal in width with the window 53 in the metal backing plate 22. Thus, the first hole 51 is composed of the window 53 made in the metal backing plate 22 to provide an entrance enough in size to allow the widthwise spread head 11 of the lug 8 to freely move through there when the lower seal 18 moves towards the horizontal flat bottom area 32 of the end cap 6, and the pocket 54 matching the window 53 in size. After the lower seal 18 has approached the end cap 6 until the hooks 11 of the lug 8 has entered into the pocket 54 through the window 53 as shown in FIG. 12(A), the lower seal 18 gets moved in the longitudinal direction thereof with keeping sliding contact with the flat bottom area 32 of the end cap 6 as shown in FIG. 12(B), until the teeth 50 of the lower seal 18 fit in the recesses 20 cut in the stem 25 above the hooks 11 to thereby clamp the necked stem 25 between them.

With the first sealing part 33 of the sealing member 23 in the lower seal 18 according to the embodiment stated earlier, although but the first hole 51 is closed with thin bottom 36 of elastic material, it will be appreciated that the first hole 51 may remain in through-hole with no thin bottom 36. The thin bottom 36 to close the first hole 51 in the first sealing part, as shown in FIGS. 6 to 9, is located on the underneath of the lower seal 18 and made with a traverse ridge 62 raised above the thin bottom 36 towards the metal backing plate 22 along a traverse edge 55 of the thin bottom 36 fronting on a border between the first and second holes 51, 37. In other words, the thin bottom 36 of the first sealing part 33 has the traverse edge 55 thereof closest to the opening 52, which is raised towards the metal backing plate 22 into the traverse ridge 62 to come into abutment against the hooks 11 to close the second hole 37 that has to inevitably remain opened underneath the teeth 50 because of design considerations of the mould.

The pedestal or necked stem 25 of the lug 8 jutting out of the end cap 6 is made with the recesses 20 extending lengthwise above the hooks 11 and beneath the bottom surface 15 of the end cap 6. The lower seal 18 is fastened to the end cap 6 when the teeth 50 formed in the metal backing plate 22 of the lower seal 18 has fit in the recesses 20 cut in the necked stem 25. Just above the hooks 11, as shown in FIG. 11(A), there is provided sidewise opposing recesses 20 that extend in the longitudinal direction of the lower seal 18 to allow the teeth 50 of the lower seal 18 to fit in the recesses 20. Thus, the lug 8 with recesses 20 on the sidewise opposite sides thereof has the shape of Tee seen from the front elevation where the stem 25 terminates in the hooks 11 extending sidewise in opposition directions to one another.

How to fasten the lower seal 18 to the end cap 6 in the linear motion guide unit of the present invention will be explained with reference to FIGS. 11(A) and 11(B) and FIGS. 12(A) and 12(B).

FIG. 11 is a fragmentary enlarged illustration viewed from the rear side of the end cap 6 to explain how the lower seal 18 comes in engagement with the associated end cap 6. Particularly, FIG. 11(A) explains a first stage where the first hole 51 in the lower seal 18 lies in line with the hooks 11 of the end cap 6 preparatory to fastening the lower seal 18 to the end cap 6, while FIG. 11(B) illustrates a finished stage where the teeth 50 of the lower seal 18 has come into engagement with the hooks 11 of the end cap 6.

Moreover, FIG. 12 is a fragmentary enlarged longitudinal section to explain the lower seal 18 comes in engagement with the end cap 6. In detail, FIG. 12(A) shows a preliminary category where the hooks 11 of the end cap 6 has been made fit in the first hole 51 of the lower seal 18, while FIG. 12(B) illustrates a finished category where the teeth 50 of the lower seal 18 have come into engagement with the recesses 20 cut just above the hooks 11 of the end cap 6.

With the linear motion guide unit constructed as stated earlier, the lower seal 18 is first set in a way the first hole 51 lies just below the associated lug 8 of the end cap 6 as shown in FIG. 11(A), and then brought into a situation where the lug 8 of the end cap 6 fits in the first hole 51 in the lower seal 18 through the window 53 of the metal backing plate 22 as shown in FIG. 12(A). Soon afterwards, having the teeth 50 of the lower seal 18 fit in the recesses 20 cut in the lug 8 results in fastening the lower seal 18 to the end cap 6.

In the linear motion guide unit according to the embodiment constructed as stated earlier, although but the hooks 11 located on the lug 8 of the slider 2 are shown as being made on both the widthwise opposite sides of the lug 8 and also the teeth 50 formed around the second hole 37 are shown as being made on both the sidewise opposite sides of the second hole 37, it will be appreciated that the hooks 11 and the teeth 50, not just the embodiment stated earlier, may be made on only any one side of the widthwise or sidewise opposite sides. As a further alternative, moreover, while either of the teeth and hooks may be made on any one side of the widthwise or sidewise opposite sides, the other may be made on both the widthwise or sidewise opposite sides. With the linear motion guide unit discussed here, rollers are selected as rolling elements, but balls, not just rollers, may be adopted for the rolling elements. The linear motion guide unit using the rolling element of ball usually needs to use a retainer plate of the type shaped like a band to keep the balls in place.

As the present invention may be embodied in several forms without departing from the spirit of essential characteristics thereof, the present embodiments are therefore illustrative and not restrictive, since the scope of the invention is defined by the appended claims rather than by the description preceding them, and all changes that fall within meets and bounds are therefore intended to embraced by the claims.

What is claimed is:

1. A linear motion guide unit;
   comprising a track rail made on a lengthwise side thereof with a first raceway surface, a slider movable lengthwise along the track rail, the slider having a second raceway surface in opposition to the first raceway surface, a rolling element running through a load raceway defined between the confronting first and second raceway surfaces, and a lower seal installed underneath the slider to close the load raceway;
   wherein the slider is provided on a bottom surface thereof with a lug terminating in a hook that juts widthwise and extends lengthwise of the slider;

wherein the lower seal is made therein with a first hole allowing the lug to fit therein, and a second hole connected to the first hole in longitudinal direction of the lower seal and made on at least any one lengthwise edge thereof with a tooth that will come into hooked engagement with the hook on the lug; and wherein the lug of the slider fits in the first hole in the lower seal and then is moved into the second hole relative to the lower seal to fasten the lower seal to the slider.

2. A linear motion guide unit constructed as defined in claim 1 wherein the slider is comprised of a carriage made with the second raceway surface and a return passage allowing the rolling element to run through there, end caps fastened to lengthwise opposite ends of the carriage, one to each end, and made therein a turnaround to connect the second raceway surface to the return passage, getting the rolling element turning about there in running direction thereof and further made thereon with the lug, the end seal fastened to the end caps, and a retainer extending along by the carriage to keep the rolling element in place.

3. A linear motion guide unit constructed as defined in claim 2 wherein both the first and second holes formed in the lower seal are made at lengthwise opposite ends of the lower seal so as to parallel the lugs of the end caps in a way oriented in the same direction along the longitudinal direction and also arranged at the same interval with one another.

4. A linear motion guide unit constructed as defined in claim 2 wherein the lug made on the slider to fasten the lower seal thereto is located at a flat bottom area near the track rail over a space reserved underneath the end cap.

5. A linear motion guide unit constructed as defined in claim 1 wherein a lengthwise dimension of the lug on the slider is made almost the same size in length as each of the first and second holes in the lower seal.

6. A linear motion guide unit constructed as defined in claim 1 wherein the lower seal includes a backing plate having a tooth extending lengthwise along at least one edge of the second hole, and an elastic sealing member adhering to the backing plate to close the load raceway.

7. A linear motion guide unit constructed as defined in claim 6 wherein the backing plate of the lower seal is composed of a major flat portion where there are formed both a slot edged with the tooth to define the second hole and a window connected lengthwise with the slot to define the first hole, and a slanting portion integral with the major flat portion and extending lengthwise while making face-to-face engagement with a slantwise surface area that extends over the space left open just underneath the slider.

8. A linear motion guide unit constructed as defined in claim 7 wherein the tooth made on the backing plate of the lower seal has at a sidewise edge thereof a sealing tip that will come into engagement with a pedestal of the lug on the slider.

9. A linear motion guide unit constructed as defined in claim 6 wherein the sealing member of the lower seal includes a first sealing part adhering to a lower side of the backing plate and extending over an entire length of the backing plate, a second sealing part lying lengthwise on an upper side of the backing plate in a fashion bulging out up to coming into contact with a slantwise surface area over the space where a lengthwise bottom surface of the carriage is partially cut away, and a third sealing part lying on the upper side of the backing plate along a longitudinal bottom surface of the end cap.

10. A linear motion guide unit constructed as defined in claim 9 wherein the first sealing part is made therein with an opening to define the second hole and a pocket constituted with the first hole that is connected lengthwise with the opening and closed with a thin bottom, and wherein the opening is larger in widthwise dimension than the slot edged with at least one tooth formed on the backing plate and roughly equal in width with the hook, while the pocket is substantially equal in width with the window in the backing plate.

11. A linear motion guide unit constructed as defined in claim 10 wherein the thin bottom is made with a traverse ridge raised above the thin bottom towards the backing plate along a traverse edge of the thin bottom.

12. A linear motion guide unit constructed as defined in claim 9 wherein the first sealing part involves a first lip extending in the longitudinal direction of the lower seal so as to come into engagement with any associated side of the track rail, and a second lip made to extend lengthwise and make sliding engagement with the slantwise surface area beneath which the space is left open.

13. A linear motion guide unit constructed as defined in claim 1 wherein a pedestal of the lug jutting out of the end cap of the slider is made with a recess extending lengthwise the hook and a bottom surface of the end cap, so that the lower seal is fastened to the end cap after the tooth made on the backing plate of the lower seal has come into engagement with the recess.

14. A linear motion guide unit constructed as defined in claim 13 wherein the lug made on the slider first fits in the pocket below the backing plate of the lower seal, and then the recess on the lug fits over the tooth on the lower seal to fasten the lower seal to the end cap.

15. A linear motion guide unit constructed as defined in claim 1 wherein the slider fits over the track rail for linear movement relative to the track rail.

* * * * *